United States Patent
Wofford, III et al.

(10) Patent No.: US 6,475,396 B1
(45) Date of Patent: Nov. 5, 2002

(54) APPARATUS AND METHOD FOR APPLYING AN OXIDANT IN A HYDROTHERMAL OXIDATION PROCESS

(75) Inventors: William Tracy Wofford, III; James Walton Griffith, both of Austin; Richard Wayne Humphries, Cedar Park; Justin Wade Lawrence, Round Rock, all of TX (US)

(73) Assignee: Hydroprocessing, LLC, Austin, TX (US)

(*) Notice: Subject to any disclaimer, the term of this patent is extended or adjusted under 35 U.S.C. 154(b) by 28 days.

(21) Appl. No.: 09/712,084

(22) Filed: Nov. 14, 2000

(51) Int. Cl.⁷ .................................................. C02F 1/72
(52) U.S. Cl. .................... 210/758; 210/761; 210/198.1; 210/199; 210/205
(58) Field of Search ................................ 210/758, 761, 210/198.1, 199, 205

(56) References Cited

U.S. PATENT DOCUMENTS

| | | |
|---|---|---|
| 3,388,199 A | 6/1968 | Chaney et al. |
| 4,822,497 A | 4/1989 | Hong et al. |
| 5,252,224 A | 10/1993 | Modell et al. |
| 5,421,998 A * | 6/1995 | Li et al. |
| 5,427,764 A * | 6/1995 | Barber |
| 5,470,481 A | 11/1995 | Modell et al. |
| 5,670,040 A | 9/1997 | Ahluwalia |
| 5,804,066 A * | 9/1998 | Mueggenburg et al. |
| 6,054,057 A | 4/2000 | Hazlebeck et al. |

FOREIGN PATENT DOCUMENTS

| | | |
|---|---|---|
| WO | WO 97/29050 | 8/1997 |
| WO | WO01/17915 A1 | 3/2001 |

* cited by examiner

Primary Examiner—Betsey Morrison Hoey
(74) Attorney, Agent, or Firm—Russell D. Culbertson; Shaffer & Culbertson LLP

(57) ABSTRACT

Heated and pressurized reactant material is caused to come into contact with oxidant in an initial contact zone (Z) within a contactor. vessel (11). This initial contact zone is removed from the walls of the vessel and the structure through which the reactant material is introduced into the vessel. Once in the contactor vessel (11), the temperature of the reactant material is elevated to critical temperature or near critical temperature in at least portions of the initial contact zone. Sulfates and similar ions liberated in the oxidation reaction form salts and precipitate from solution generally in. the initial contact. zone removed from the contactor vessel walls and then tend not to adhere to equipment at points downstream from the initial contact zone.

25 Claims, 4 Drawing Sheets

APPARATUS AND METHOD FOR APPLYING AN OXIDANT IN A HYDROTHERMAL OXIDATION PROCESS

TECHNICAL FIELD OF THE INVENTION

This invention relates to hydrothermal oxidation processes and to equipment for facilitating hydrothermal oxidation reactions. More particularly, the invention relates to an arrangement for bringing an oxidant into contact with a reactant material to oxidize the reactant material in a hydrothermal process. The invention encompasses both an apparatus and method for bringing the oxidant into contact with the reactant material.

BACKGROUND OF THE INVENTION

Hydrothermal oxidation involves bringing a reactant material to be oxidized, water, and an oxidant together under an elevated temperature and pressure to effect a partial or complete oxidation of the reactant material. Hydrothermal processes may be carried out at various combinations of temperature and pressure. For example, the reaction temperature may be below the critical temperature for water and the pressure may be below the critical pressure for water. Alternatively, the temperature or pressure, or both may be at or above the respective critical point for water. Although the critical temperature and pressure may vary somewhat depending upon other materials present with water, the critical temperature for water is approximately 705 degrees Fahrenheit and the critical pressure is approximately 3200 pounds per square inch.

Hydrothermal processes may be employed in many different applications. For example, hydrothermal processes, may be used to treat wastewater containing organic and inorganic contaminants. In particular, municipal and industrial sewage sludge may be destroyed using a hydrothermal process to produce primarily heat energy, clean water, carbon dioxide gas, and residual minerals and salts. Heat energy from the hydrothermal process may be used to generate electricity. Also, organic fuels such as coal or petroleum may be oxidized in a hydrothermal process to produce heat energy that can be used for electrical power generation.

Hydrothermal oxidation occurring at conditions above both the critical temperature and pressure for water is commonly referred to as supercritical water oxidation or SCWO. Water at supercritical conditions (SCW) is neither a liquid nor a vapor, but can be properly characterized only as a supercritical fluid having a density significantly less than liquid water but significantly greater than water vapor. The density of SCW increases with increasing pressure at constant temperature. At very high pressures, greater than 40,000 psia for example, the density of SCW resembles that of liquid water. For the purposes of this discussion, SCW is assumed to exist at moderate temperatures between 705° F. and 1200° F. and moderate pressures of 3200–5000 psia. Nonpolar substances such as oxygen gas and most organic compounds are highly soluble in SCW. Due to the solubility of organic compounds and oxygen in SCW and the characterization of SCW as neither a liquid nor gas, SCW provides essentially a single-phase reaction environment that eliminates the relatively slow process of transferring reactants and products between separate gas and liquid phases. The single-phase reaction environment combined with a high reaction temperature in SCWO results in rapid and complete oxidation of organic compounds. Thus, it is desirable in a hydrothermal process to conduct at least part of the reaction at supercritical conditions in order to rapidly and more completely oxidize the given reactant material.

While nonpolar substances such as oxygen and most organic compounds are highly soluble in SCW, polar substances that may be encountered in hydrothermal processes have very low solubility in SCW. In particular, inorganic compounds such as salts have very limited solubility in SCW even though they may be very soluble in liquid water. Typically, the solubility of salt in water changes by relatively small amounts as the aqueous solution is heated. The solubility change may be seen as a slight increase or decrease in the solubility limit, depending on the specific salt. If the solution is heated to its critical temperature, the solubility of the salt will experience a sudden decrease as the water transitions from a polar solvent to a nonpolar solvent. The largest reduction in salt solubility generally occurs in the near-critical temperature range of 650° F. to 720° F. The temperature at which a given salt in an aqueous solution begins to experience the sudden decrease in solubility will be referred to in this disclosure and the accompanying claims as the "salt precipitation temperature."

Although the solvent properties of SCW are very desirable in destroying organic compounds, the low solubility of inorganic salts in SCW has posed problems in prior SCWO systems. Salts may enter a SCWO system as part of the feed stream being treated or may form later in the reaction stream as a result of hydrolysis and the oxidation of organic heteroatoms such as sulfur, phosphorus, and nitrogen. Regardless of the source of the salts in the SCWO system, the salts precipitate from the reaction stream as the salt precipitation temperature of the solution is approached. The precipitated salts adhere to the internal surfaces of devices in the SCWO system to form scale. These scale deposits may occur in heat exchangers, heater coils, and reactors in a SCWO system, resulting in reduced heat exchange capacity, increased back pressure within the system, and ultimately, a completely plugged system. Thus, SCWO systems must be shut down periodically to remove scale deposits and thereby restore heat transfer efficiency and prevent plugging.

Numerous solutions have been proposed to overcome the salt scaling problem in hydrothermal processes. Some proposals include arrangements that treat rapid scale formation as an inevitability, and simply address the cleaning process. Other proposed solutions involve protecting the walls of the hydrothermal reactor to prevent deposition of precipitated materials. One of these wall-protecting solutions is described in U.S. Pat. No. 5,670,040, and involves conducting the supercritical oxidation reaction in a special platelet or transpiration tube. This transpiration tube includes openings that allow water to be continuously injected into the tube. The injected water is intended to form a protective barrier at the surface of the tube in order to prevent precipitated materials from adhering to the tube.

The previously proposed solutions to the scaling problem in hydrothermal processes, including the above described proposals, have generally proven unacceptable for various reasons. Most of the proposed solutions are costly and do not adapt themselves well to a continuously operating, robust system. Others simply do not work at the demanding conditions required for supercritical water oxidation. Considering the desirable attributes of supercritical water oxidation for waste treatment and other applications, there remains a need for a solution to the problem of rapid salt scaling in supercritical water oxidation systems.

SUMMARY OF THE INVENTION

It is an object of the invention to provide an apparatus and method to overcome the above-described problems associated with hydrothermal oxidation processes. More to particularly, it is an object of the invention to provide an apparatus and method for reducing or eliminating salt deposition (scaling) in hydrothermal oxidation reactors, heat exchangers, heaters, and related equipment.

This object is accomplished according to the invention by controlling the spatial location and temperature and pressure conditions where an oxidant comes into contact with reactant material and salts are formed and/or precipitated in the hydrothermal system.

As used in this disclosure and the accompanying claims, the term "hydrothermal oxidation" means an oxidation reaction in the presence of water at an elevated temperature and pressure. The term "reactant material" means the feed material to be treated in the hydrothermal oxidation process, and may include water along with materials to be oxidized. "Oxidant" refers to any oxidant material suitable for use in the hydrothermal oxidation process including, air, oxygen, hydrogen peroxide, or nitrate, for example. The term "reaction stream" means the stream of materials existing after oxidant, water, and reactant material are combined in the hydrothermal system.

According to the present invention, pre-heated and pressurized reactant material is caused to come into contact with oxidant in an initial contact zone within a contactor vessel. This initial contact zone is removed from the walls of the vessel and the structure through which the reactant material is introduced into the vessel. The temperature of the reactant material is elevated to a temperature greater than the salt precipitation temperature for the expected salts in at least portions. of the initial contact zone. Sulfates and other negatively-charged ions formed by oxidation of reactant material in the initial contact zone associate with calcium and other positively-charged ions to form salts. Sulfate, calcium and other ions introduced with the reactant material will also associate to form salts in the initial contact zone. if Because the temperature within portions of the initial contact zone in the contactor is greater than the salt precipitation temperatures of the various salts in the initial contact zone, the majority of salts will precipitate from the solution generally in the initial contact zone removed from the contactor vessel walls. These precipitated salts then tend not to adhere to equipment at points downstream from the initial contact zone. Thus, the precipitation of salts in the contactor vessel at points removed from the contactor vessel walls reduces or eliminates scale buildup on the contactor vessel walls and in equipment downstream from the contactor vessel.

The method according to the invention includes injecting reactant material into the initial contact zone within the contactor vessel. This injected reactant material has previously been pressurized to a processing pressure above the critical pressure and heated to an elevated temperature which may be below the critical temperature and preferably below the reactant material charring temperature. For purposes of this disclosure and the accompanying claims "charring temperature" for a given reactant material is defined as the temperature at which the rate of formation of thermal decomposition products (char) in the reactant material results in unacceptable fouling of heat transfer surfaces in the hydrothermal treatment system. The method further includes injecting a separation material, preferably water, into a separation zone adjacent to the reactant material in the initial contact zone. This injected water has been pressurized to the processing pressure and typically heated to a temperature higher than the reactant material temperature, near or above the critical temperature for water. The method also includes injecting the oxidant into the contactor vessel at one or more points separated from the reactant material by the water in the separation zone.

In operation, the oxidant diffuses quickly through the "injected" water at or near critical conditions. Once the oxidant has diffused through the injected water and reaches the reactant material in the initial contact zone, the oxidation of reactant material progresses rapidly to form various reaction products. Salts in or near the initial contact zone precipitate from the aqueous-fluid phase generally in or near the initial contact zone and in any event away from the walls of the contactor vessel. It has been found that this control of the location and conditions under which the oxidant comes into contact with the reactant material according to the present invention, together with the appropriate fluid velocity of the reaction stream, prevents the precipitated salts from adhering substantially to the contactor vessel walls or to the walls of equipment downstream from the initial contact zone.

The step of injecting the reactant material into the contactor vessel preferably includes injecting the reactant material into the vessel through a reactant material injection area centered on and perpendicular to a longitudinal axis of the contactor vessel. In this preferred form of the invention, water is injected into the contactor vessel through an annular area around the reactant injection area and oxidant is injected through an annular oxidant injection area around the water injection area. In order to ensure that the oxidant contact with the reactant material does not occur until the streams reach points downstream from the injection areas themselves, the reactant injection area, water,injection area, and oxidant injection area are all aligned in a common injection plane. Also, the reactant material, water, and oxidant are each preferably injected into the contactor vessel to provide a generally laminar flow regime in the water and reactant material for a substantial distance downstream from the injection plane. The laminar flow regime in the water and reactant material helps prevent the two materials from mixing too rapidly and placing reactant material in initial contact with oxidant near the contactor vessel walls or material injection structures.

The preferred form of the invention includes heating the reactant material and water prior to injection into the contactor vessel by heat exchange with effluent from the hydrothermal oxidation reaction. Since the reactant material and water are preferably heated to different temperatures, the method preferably includes splitting the hydrothermal oxidation effluent stream in at least two separate streams. This split may be accomplished at supercritical conditions with a hydrocyclone to form a suspended solids-laden underflow and clean fluid overflow. One effluent stream may then be placed in a heat exchange relationship with either the reactant material or water, and the other effluent stream is placed in a heat a exchange relationship with the remaining material. In the preferred form of the invention, the water is heated to a higher temperature than that of the reactant material. In this way, not only does the water serve to initially separate the oxygen and the reactant material, but it also provides rapid heating of the reactant stream to a temperature greater than the salt precipitation temperature. The oxidant begins to react with the reactant material at substantially the same time that salt precipitation temperature is achieved in the reactant stream, now at least partially mixed with the injected water.

The apparatus according to the invention includes a contactor vessel having inner walls defining a contactor volume encompassing the initial contact zone spaced apart from the vessel walls. A reactant material injector and an oxidant injection arrangement are both connected to the contactor vessel. The reactant material injector is connected to the contactor vessel in a position to inject the reactant material into the initial contact zone, while the oxidant injection arrangement includes one or more oxidant injection openings at points spaced apart from the reactant material injector by a separation material or water injection area.

The preferred contactor apparatus includes a generally cylindrical contactor vessel having a longitudinal axis defining a contactor axis. The reactant material injector includes a reactant material conduit coaxially mounted in the contactor vessel with an end of the conduit defining a reactant material injection area. A water conduit has an inner diameter larger than the reactant material conduit and is mounted coaxially with the reactant material conduit. The annular area between the water conduit and the reactant conduit comprises the water injection area in the preferred form of the invention. A still larger diameter, coaxially mounted conduit defines an annular area outside of the water injection area and this annular area comprises the preferred oxidant injection opening.

These and other objects, advantages, and features of the invention will be apparent from the following description of the preferred embodiments, considered along with the accompanying drawings.

DESCRIPTION OF THE PREFERRED EMBODIMENTS

Figure 1:
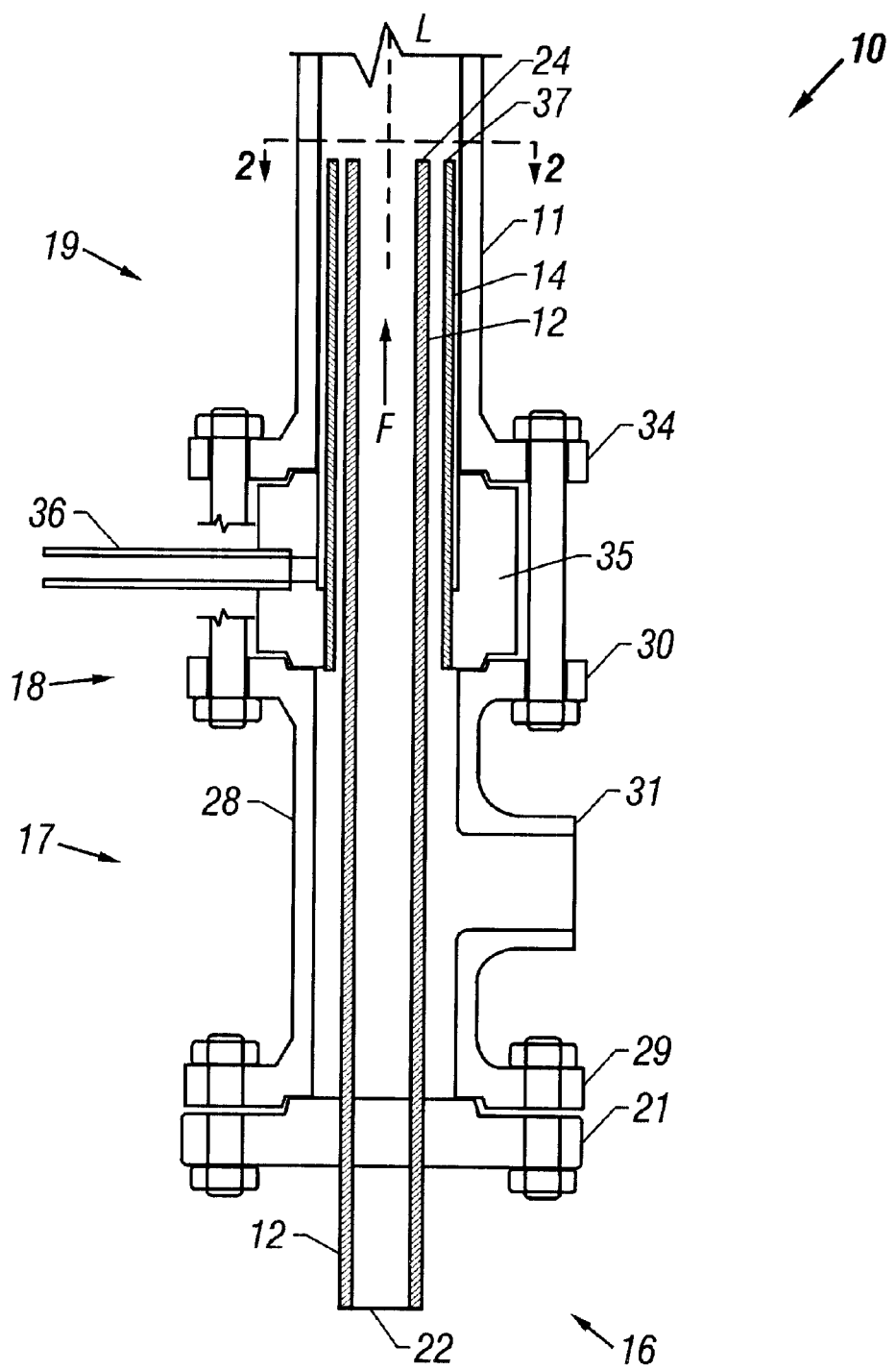
FIG. 1 is a view in longitudinal section of a contactor apparatus embodying the principles of the invention.
Figure 2:
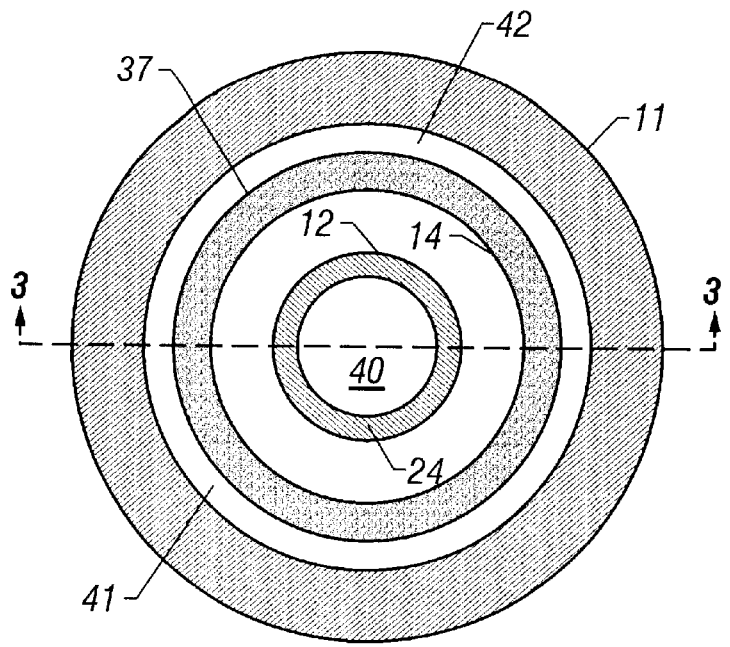
FIG. 2 is a transverse section view taken along line 2—2 in FIG. 1.

Referring to FIGS. 1 and 2, a contactor 10 embodying the principles of the invention includes a contactor vessel 11 comprising an elongated cylindrical conduit or tube having a contactor axis L. Two additional conduits are associated with the contactor vessel 11. These conduits are a reactant material conduit 12 and a separation material or water injection conduit 14. Reactant material conduit 12 comprises a cylindrical tube mounted coaxially within 18 contactor vessel 11 on contactor axis L. Water injection conduit 14 comprises a cylindrical tube that is larger in diameter than the reactant material conduit and also mounted coaxially within contactor vessel 11 on contactor axis L.

As will be discussed below, in a hydrothermal process utilizing contactor 10, the contactor contains materials at elevated temperatures and pressures up to and including supercritical temperatures and pressures for water. The materials from which contactor vessel 11 and conduits 12 and 14 are formed must be materials that may withstand the operating temperatures and pressures encountered in the particular hydrothermal processes in which the contactor is employed. Also, the materials used for the various components of contactor 10 which come in contact with near critical and supercritical mixtures within the contactor must be resistant to the corrosive nature of such materials. For example, for treating wastewater sludge and for many other applications, Alloy 625 is a suitable material-for contactor vessel 11, reactant material conduit 12, and conduit 14.

Although the invention is not limited to the particular structure shown in FIG. 1, FIG. 1 does illustrate one preferred construction of the contactor 10 according to the invention. This preferred construction includes a reactant material component 16, a separation material or water component 17, an oxidant component 18, and a contactor vessel component 19. Reactant material component 16 includes the elongated reactant material conduit 12 welded to a suitable assembly flange 21. A reactant material supply inlet 22 is located at one end of reactant material conduit 12 while the opposite end of the conduit comprises a reactant material injection end 24 open to contactor vessel 11.

Water supply component 17 includes a water supply conduit 28 having a first flange 29 at one end and a second flange 30 at the opposite and. Water supply component 17 also includes a water supply opening 31 adapted to be connected to a water supply. First flange 29 is adapted to connect with the assembly flange 21 associated with reactant material conduit 12, while second flange 30 is adapted to connect with oxidant component 18 and contactor vessel component 19.

Contactor vessel component 19 includes contactor vessel conduit 11 and a contactor vessel flange 34. Oxidant component 18 includes a sleeve 35 adapted to be connected between the second flange 30 of water supply conduit 28 and the contactor vessel flange 34. Sleeve 35 is connected to the water injection conduit 14 and an oxidant inlet conduit 36 adapted to be connected to an oxidant supply. Water injection conduit 14 is welded or otherwise connected at one end to sleeve 35, while the opposite end forms an injection end 37 that is open to contactor vessel 11.

Figure 3:
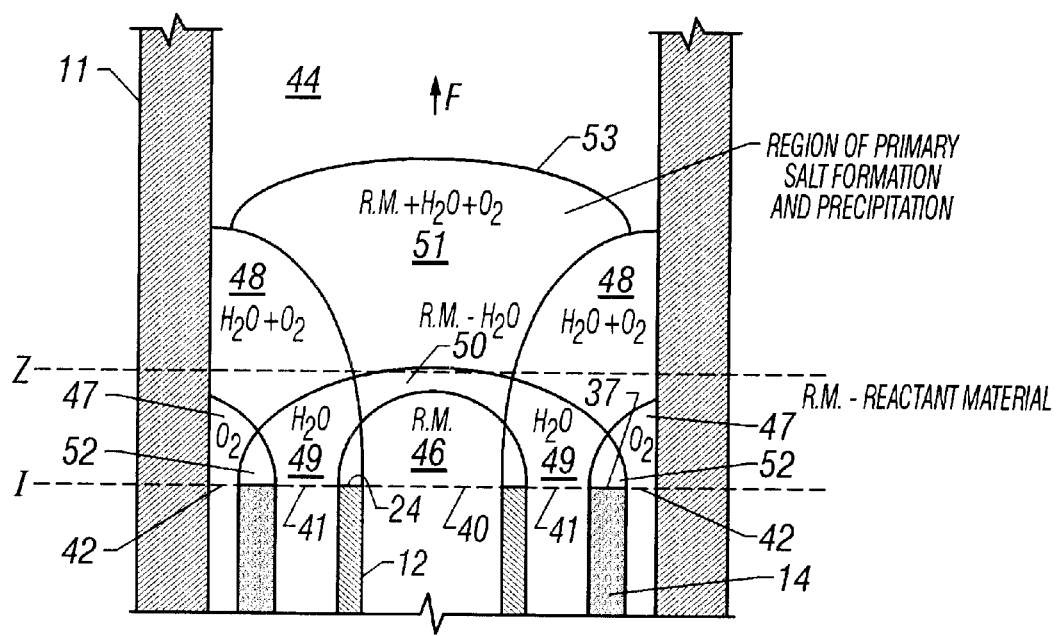
FIG. 3 is a diagrammatic representation of material injected into the contactor apparatus according to the present invention.

Referring now to FIGS. 1 through 3, the injection end 24 of reactant material conduit 12 and the injection end 37 of conduit 14 are each aligned in a common injection plane shown at line I in FIG. 3. As shown best in FIG. 2, injection end 24 of reactant conduit 12 defines a reactant material injection area, shown generally at reference numeral 40. Injection end 24 and end 37 of conduit 14 together define a water injection area 41. This water injection area 41 comprises the annular area between end 24 of reactant material conduit 12 and end 37 of conduit 14. The inner walls of contactor vessel 11 and outer wall of conduit 14 combine to define an annular oxidant injection area or opening 42. The portion of contactor vessel 11 upstream of injection plane I (below plane I in FIG. 3) may be thought of as an oxidant conduit since it provides a containment arrangement for oxidant being introduced into contactor 10. The portion of contactor vessel 11 downstream from plane I defines a contactor space or volume 44 as shown in FIG. 3.

The operation of contactor 10 and the method according to the invention may be described with reference to FIGS. 1 and 2 and particularly to the diagrammatic representation shown in FIG. 3. The direction of flow is labeled in FIGS. 1 and 3 at arrow F and comprises the direction in which reactant material, oxidant, and water are injected into contactor 10 and also the direction in which the reaction stream travels to exit contactor 10. Referring to FIG. 1, reactant material conduit 12 receives pressurized and heated reactant material through the inlet 22. As will be discussed further below, the pressure of the reactant material is a processing pressure preferably above the critical pressure for water, while the reactant material temperature prior to entry into contactor 10 is at an elevated temperature preferably below the charring temperature for the particular reactant material. Water 1A component 17 receives heated and pressurized water through the water supply inlet 31. The water is received at substantially the processing pressure and at a temperature preferably above the reactant material temperature, and more preferably at or above the critical temperature for water. Simultaneously with the reactant material and water supplied to their respective conduits, an oxidant is supplied through oxidant inlet 36 in the oxidant component 18 of contactor 10. This oxidant is supplied at substantially the processing pressure.

Each distinct stream, water, oxidant, and reactant material flow in their respective conduit or annular space in direction F and enter the contactor space 44 at the injection plane I. In the preferred form of the invention, the flow rate of the reactant material stream through conduit 12 and the flow rate of water stream through the annular space defined within conduit 14 are both controlled to provide a substantially laminar flow regime or least minimal turbulence in the streams. Referring now particularly to FIG. 3, reactant material stream flowing in direction F mixes with water at its boundary with water and eventually spreads outwardly to the inner wall of contactor vessel 11. The substantially pure reactant material zone is shown at 46 in FIG. 3 (reactant material is labeled as RM in the figure). Reactant material mixed with the injected water is shown in FIG. 3 at zone 50, while a zone of reactant material mixed with injected water and oxidant is shown at zone 51. The oxidant material, which is freely miscible in water at the conditions under which is injected, quickly diffuses through the water. The annular area at 47 represents an area of oxidant prior to diffusion through the water while the area at 48 represents an area in which the oxidant has at least partially diffused through the water to form a water and oxidant mixture. The annular area shown at 49 comprises a substantially pure water or separation zone. This pure water zone 49 results from the fact that the oxidant cannot diffuse immediately through the injection water, but diffuses completely through the water a short distance downstream from injection plane I. Areas 52 adjacent to the ends 24 and 37 of conduits 12 and 14, respectively, represent quiescent areas that form as the injected material flows into contactor vessel 11.

Due to the placement of the water injection area 41 (seen in FIGS. 2 and 3) between oxidant injection area 42 and reactant material injection area 40 in plane I, and due to the continuous flow of material in direction F, oxidant reaches the reactant material at a short distance downstream from plane I. The transverse plane through contactor vessel 11 at which oxidant first reaches the reactant material is shown at plane Z in FIG. 3. The intersection of zone 51 with plane Z comprises an initial contact zone within the volume of the contactor vessel. This portion of zone 51 and the additional portion from plane Z to line 53 comprises the region of primary salt formation and precipitation in the hydrothermal system.

The oxidation reaction begins immediately at the initial contact zone at plane Z in FIG. 3. Downstream from this point, the reactant material is rapidly heated by mixing with the preferred higher temperature injection water. The reactant material is also heated by the heat released from the exothermic oxidation reactions occurring between constituents of the reactant material and the oxidant at these hydrothermal conditions. Flow rate along with injection water temperature and/or the injected reactant material temperature are controlled so that the temperature of the reactant material-water mixture in zone 51 is above the salt precipitation temperature. At these conditions the salt solubility limit is extremely low and most of the salt will precipitate immediately as a separate solid or molten phase. According to the invention, by the time constituents of the reactant material reach the inner wall of contactor vessel 11 near line 53, the majority of the salts that will exceed the solubility limit for supercritical conditions have formed and have precipitated along with salts originally in the reactant material. These salts precipitate in areas away from the walls of vessel 11 and away from other components of contactor 10 such as the injection ends 24 and 37 of conduits 12 and 14, respectively. It has been found that salts which precipitate within the bulk fluid (generally in zone 51 in FIG. 3 below line 53) tend not to adhere to surfaces both within contactor 10 and in the remainder of the hydrothermal processing equipment downstream from the contactor.

In designing contactor 10, consideration must be given to the fluid velocities and flow rates of the reactant material, injection water, and oxidant at injection plane I, the location where they enter the contactor space. Above a maximum velocity for each material, the mixing of the streams becomes too turbulent, resulting in initial oxidant contact with reactant material too near the contactor surfaces and thus salt deposition on contactor surfaces. This maximum flow rate may be on the order of approximately 3 to 5 ft/sec in a contactor designed for a wastewater sludge treatment unit, for example. Below a minimum mass flow rate for the injection water stream, there is also an inadequate separation between the injection plane I and the points at which oxidant first reaches the reactant material, resulting in salt deposition on contactor surfaces. This minimum mass flow rate for the injection water stream may be on the order of 5–10 wt. % of total mass flow rate flowing into contactor vessel 11. Furthermore, sufficient fluid velocity must be maintained in the reaction stream to prevent deposition within the hydrothermal device due to gravity settling.

Those skilled in the art will appreciate that the chemical reactions occurring in the contactor vessel will not necessarily be limited to oxidation reactions. Rather, constituents in the process stream may undergo hydrolysis to form various reaction products including salts. Although it is expected that there will be numerous intermediate reactions in the reaction stream, organic materials are ultimately completely oxidized or nearly completely oxidized if sufficient oxidant is injected into the contactor. In any event, the invention is not limited to any particular reactions occurring within contactor vessel 11 or the reaction stream downstream from the contactor vessel.

Also, the invention is not limited to the materials labeled in FIG. 3 for purposes of example and for purposes of simplifying the discussion. For example, water is shown as the separation material used to maintain physical separation between the reactant material and the oxidant as the materials enter contactor vessel 11 across plane I. However, any fluid or slurry suitable for addition to the process stream may be used as a separation material according to the invention. Also, as discussed above, the oxidant employed in contactor 10 is not limited to oxygen, but may comprise any suitable oxidant, or even a second reactant material. That is, the separation concept employed in contactor 10 may be used to facilitate reactions between the reactant material as described above and a second reactant that may or may not be an oxidant. An oxidant is used as the primary example in this disclosure rather than some other second reactant because the invention is uniquely suited for use in treating a reactant material comprising a municipal sewage sludge. In this sewage sludge application of the invention, the second reactant does comprise an oxidant as described above. However, it will be appreciated that the invention may be used in reactions between a reactant material and any desired second reactant, and that this second reactant may comprise an oxidant in some preferred applications.

Figure 4:
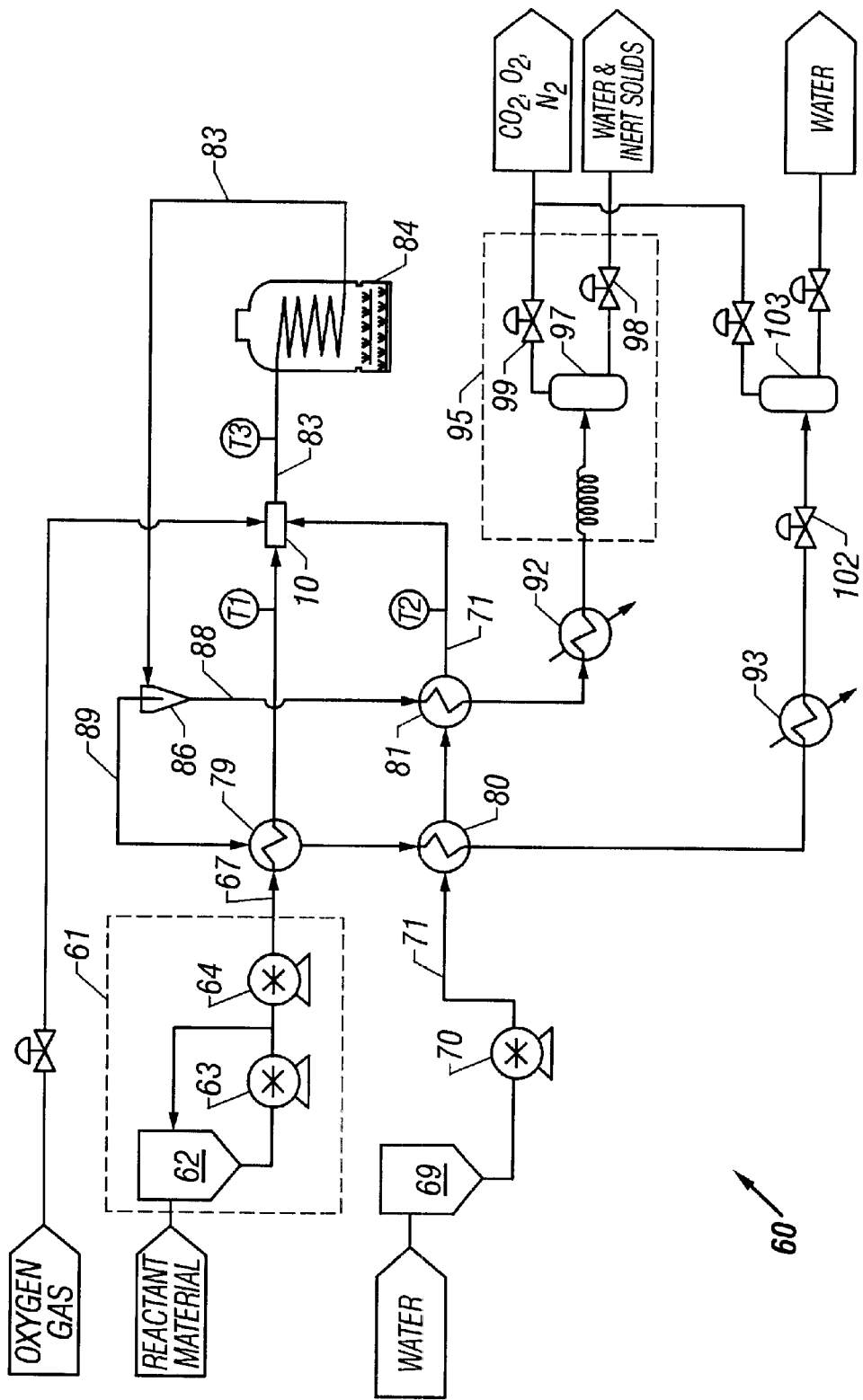
FIG. 4 is a diagrammatic representation of a hydrothermal processing system in which the present contactor apparatus and method may be employed.

FIG. 4 shows a hydrothermal treatment system 60 in which contactor 10 is employed. This hydrothermal system is well suited for treating organic waste materials including municipal sewage sludge. However, it will be appreciated that the invention is not limited to this particular hydrothermal application.

Hydrothermal treatment system 60 includes a reactant material supply arrangement 61. This arrangement includes a reactant material supply vessel 62, a low pressure feed pump 63, and a high-pressure pump 64. In the case of a municipal sewage sludge, the reactant material will include a slurry comprising organic wastes contained in a slurry with water along with suspended inorganic materials such as silt, sand, and clays. High-pressure pump 64 receives a low pressure slurry comprising the reactant material and pressurizes the material to the processing pressure above critical pressure. This pressurized reactant material is then directed through reactant material feed conduit 67.

Hydrothermal system 60 also includes a water supply vessel 69 and high-pressure water pump 70. Pump 70 pressurizes the water to substantially the processing pressure and directs the pressurized water to water feed conduit 71. Water is preferably recycled through the system so that at least a portion of the water in water supply vessel 69 comprises water recovered from the effluent of the hydrothermal system 60.

A heat exchanger arrangement is included in system 60 for heating the pressurized reactant material, and a separate heat exchanger arrangement is included for heating the pressurized water. The reactant material heat exchanger arrangement includes heat exchanger 79 connected with reactant material feed conduit 67, while the water heat exchanger arrangement includes two separate heat exchangers 80 and 81 connected with water feed conduit 71.

Downstream of contactor 10, hydrothermal treatment system 60 includes sufficient conduit 83 to provide the residence time necessary to effect the desired destruction or oxidation of the reactant material. A portion of this conduit path extends through a heater/cooler 84. Heater/cooler 84 is used in system start up to heat system components to their respective operating temperature. Heater/cooler 84 may also be used to adjust the temperature of the reactant material to suit the desired hydrothermal process being performed in system 60. It will be noted that FIG. 4 does not include a separate "reactor vessel." This is because significant oxidation reactions in system 60 begin to occur in the initial contact zone (at plane in FIG. 3) and may continue at points downstream from the initial contact zone. Thus, all conduit downstream of the initial contact zone may be considered a reactor vessel. Of course, where the oxidation reaction is conducted at critical conditions for water, the reactions proceed very rapidly and will be essentially complete after a residence time of approximately 15–120 seconds at or above critical conditions, and assuming sufficient oxidant is added in contactor 10 to satisfy the chemical oxygen demand (COD) of the injected reactant material. The oxidation reactions may thus be complete by the time the combined material stream exits heater/cooler 84 if not before that point.

In the sewage sludge treatment application, and any other application where complete destruction of organics is desired, the effluent from the hydrothermal oxidation reaction downstream of contactor 10 will comprise water, carbon dioxide, precipitated salts, perhaps some salts in solution, and inorganic residual material such as clay or sand. Conduit 83 directs this effluent to a stream splitting arrangement. The preferred stream splitting arrangement comprises a hydrocyclone 86 which functions to split the effluent stream from conduit 83 into a suspended solids-laden stream (underflow) and a clean (essentially free of suspended solids) effluent stream (overflow). The suspended solids-laden stream exits hydrocyclone 86 from the underflow to conduit 88 while the clean effluent stream exits the hydrocyclone from the overflow of the device to conduit 89. It will be noted that the effluent in conduit 83 will preferably be at above critical conditions. Thus, most of the precipitated salts will be separated from the clean effluent and remain in the suspended solids-laden stream along with other solids. These precipitated salts will redissolve generally only after the stream drops below the salt precipitation temperature.

In one preferred form of the invention, one of the two effluent streams from hydrocyclone 86 is used to heat the pressurized reactant material carried by conduit 67 while the other effluent stream is used to heat the water carried by conduit 71. In the example system 60 shown in FIG. 4, the suspended solids-laden effluent in conduit 88 is placed in a heat exchange relationship with pressurized water in heat exchanger 81. The clean effluent in conduit 89 is first placed in heat exchange relationship with the pressurized reactant material in heat exchanger 79 and then in heat exchange relationship with the pressurized water in heat exchanger 80.

The suspended solids-laden effluent stream in conduit 88 may be cooled further in water cooler 92 and then directed to pressure let down arrangement 95 suitable for reducing pressure in a liquid stream carrying significant suspended solids. This arrangement is preferably of the type shown in U.S. Pat. No. 5,888,389, the entire content of which is hereby incorporated herein by this reference. Pressure let down arrangement 95 includes a pressure reducing device 96, an intermediate-pressure separation vessel 97, a liquid/solids outlet controlled by two-position valve 98, and a gas outlet controlled by a pressure regulator valve 99.

The clean effluent carried by conduit 89 may be cooled further with water cooler 93 and then directed to a clean fluid pressure let down arrangement 101. The illustrated clean fluid pressure let down arrangement 101 includes a pressure reducing valve 102 and an ambient pressure gas/liquid separator 103.

The apparatus shown in FIG. 4 is particularly well-suited for treating wastes such as municipal and industrial sewage sludge to produce clean water which may be released to the environment along with other substantially innocuous reaction products. Where a typical municipal sewage sludge comprises the reactant material, the maximum temperature at location T1 in FIG. 4 is limited by the charring temperature of the pressurized sludge. That is, temperature T1 must be kept below approximately 500 to 650 degrees Fahrenheit (depending upon the nature of the sewage sludge) to prevent char from forming and collecting at an unacceptable rate in heat exchanger 79 and the remainder of conduit 67 leading to contactor 10. However, the temperature T3 of the combined stream generally immediately downstream from the injection plane I (FIG. 3) in contactor 10 must be greater than the salt precipitation temperature for the salts of concern in the system in order to provide the scale reduction effect according to the invention. The temperature of the reactant material may be raised quickly from the reactant material temperature below the charring temperature to a temperature greater than the salt precipitation temperature by ensuring that the temperature of the water at point T2 is sufficiently high and preferably, well above the critical temperature, between 740 and 900 degrees Fahrenheit for example. Downstream of injection plane I (FIG. 3) in contactor 10, the temperature of the mixed stream may rise significantly above the critical temperature due to the oxidation reactions occurring in the stream.

Typically, municipal sewage sludge mass flow rate in system 60 ranges from 75 wt. % to 95 wt. % of the combined liquid flow, with injection water making up the balance. Oxygen mass flow rate can typically vary from 100% to 130% of the Chemical Oxygen Demand, depending on the reactant material. The mass ratio of overflow to underflow at the hydrocyclone is typically between 3:1 and 4:1 but may be varied to accommodate variations in the reactant material and the particular operating conditions.

It will be appreciated that the arrangement of system 60 set out in FIG. 4 is just one preferred form of hydrothermal treatment system employing contactor 10 according to the invention. Numerous variations in the system may be made without departing from the scope of the invention. One such variation relates to the effluent from the hydrothermal process. Specifically, the hydrothermal effluent need not be split into two separate streams as shown in FIG. 4. Alternatively to the arrangement set out in FIG. 4, a single effluent stream may exchange heat with the injection water and reactant material in order to provide the desired heating of those streams prior to contactor 10. Any suitable heat exchange arrangement may be used to provide the desired heating in the water and reactant material streams prior to entering contactor 10.

As discussed above, the heat applied to the reactant material prior to oxidant injection in contactor 10 must be controlled in order to limit the build up of thermal decomposition products (char) within heat exchanger 79 and reactant material conduit 67. However, depending upon the reactant material, it may not be possible to keep the temperature of the reactant material sufficiently low to eliminate all charring and still reach the salt precipitation temperature as desired in contactor 10. In this case char deposits may build up, particularly in heat exchanger 79, and eventually reduce the heat exchange capacity or build up back pressure within the heat exchanger. Heat exchanger 79 must then be cleaned, which commonly requires shutting down the entire system.

Figure 5:
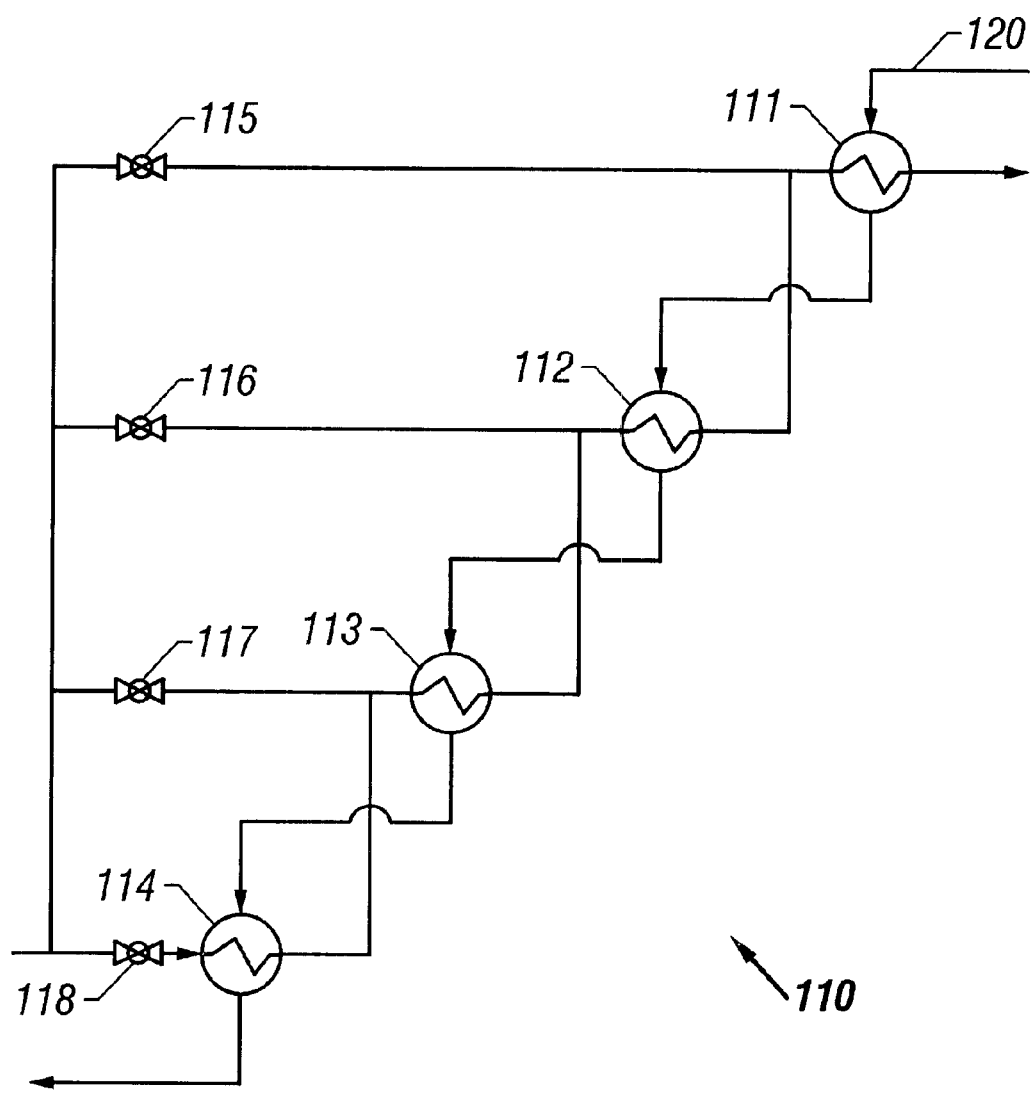
FIG. 5 is a diagrammatic representation of a preferred heat exchanger arrangement for heating the reactant material prior to injection into the contactor vessel according to the present invention.

One solution for increasing the operation time before cleaning is required is to replace the single heat exchanger 79 with multiple heat exchangers that may be connected in series. FIG. 5 illustrates such a series-connected heat exchanger arrangement 110 suitable for use in place of heat exchanger 79. Heat exchanger arrangement 110 includes heat exchangers 111, 112, 113, and 114, and control valves 115, 116, 117, and 118. Initially, control valves 116, 117, and 118 are closed and valve 115 is opened so that first heat exchanger 111 heats the reactant material by heat exchange with a suitable fluid in line 120, preferably an effluent stream from the hydrothermal process. Once the heat exchange capacity of this first heat exchanger is degraded to a certain point due to char build up, valve 116 is opened and valve 115 is closed, thus causing heat exchanger 112 to begin operating in series with heat exchanger 111. Similarly, additional heat exchangers 113 and 114 may be brought on line as needed to extend the operation time between char clearing procedures. This placement of heat exchangers in series also allows for the control of reactant material temperature exiting the heat exchangers to minimize the charring and maintain the temperatures at each location from the exit of the heat exchangers to the entrance to the heater/cooler 84 at the most ideal temperature. This is accomplished by the ability to control the temperature of both the sludge exiting its heat exchanger, and the water exiting its heat exchanger. The temperature of the sludge exiting its heat exchanger may be controlled by varying the available heat exchanger area and by varying the underflow/overflow ratio, which is the ratio of the flow rate in line 89, FIG. 4, to the flow rate in line 88 in FIG. 4. The temperature of the water exiting heat exchanger 81 may be varied by increasing the underflow/overflow. An increase in the mass flow rate in line 88 results in a higher temperature for the water exiting heat exchanger 81 and a lower temperature of the sludge-exiting heat exchanger 79.

Alternatively to the series-connected heat exchanger arrangement shown in FIG. 5, heat exchangers may be arranged in parallel. One heat exchanger may be used to heat the reactant material while the other heat exchanger is bypassed and cleaned. The parallel heat exchangers may be alternated back and forth between operation and cleaning, possibly without interrupting the hydrothermal process. These parallel heat exchangers may each consist of a series of heat exchangers as described above with reference to FIG. 5.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the preferred contactor 10 shown in FIGS. 1 through 3 shows a series of coaxially mounted conduits to form the various injection areas or openings according to the invention, the conduits may be mounted somewhat eccentrically to form eccentric annular areas for separation material and oxidant injection. This structural variation is to be considered an equivalent of the coaxial arrangement illustrated in the figures. Also, the oxidant opening need not comprise an annular area extending completely around the separation material injection area. Rather, an oxidant opening or a number of such openings may be located in the injection plane, with each opening separated from the reactant material injection area by a portion of the separation material injection area. Furthermore, although the contactor apparatus is described above primarily in relation to a sewage sludge treatment system, the contactor may be employed in other hydrothermal treatment applications. Some applications may involve adding oxidant below the chemical oxygen demand of the reactant material to effect a partial oxidation.

What is claimed is:

1. An apparatus for bringing, an oxidant into contact with a reactant material to facilitate hydrothermal oxidation of the reactant material, the apparatus including:

(a) a contactor vessel;

(b) a reactant material conduit having a reactant material injection end defining a reactant material injection area in an injection plane;

(c) a separation material conduit having a diameter larger than the reactant material conduit and positioned substantially coaxially with the reactant material conduit, the separation material conduit having a separation material injection end which, together with the reactant material injection end of the reactant material conduit, forms an annular separation material injection area within the injection plane and surrounding the reactant material injection area; and (d) an oxidant injection arrangement having one or more oxidant injection openings into the contactor vessel substantially in the injection plane and spaced apart from the reactant material injection area.

2. The apparatus of claim 1 wherein the contactor vessel has a longitudinal axis defining a contactor axis and the reactant material conduit is positioned coaxially with the contactor vessel.

3. The apparatus of claim 1 wherein the oxidant injection arrangement includes a single oxidant injection opening.

4. The apparatus of claim 3 wherein the oxidant injection arrangement includes:

(a) an oxidant conduit having a diameter larger than the separation material conduit and positioned coaxially with the reactant material conduit, the oxidant conduit together with the separation material injection end of the separation material conduit defining an annular oxidant injection area, the annular oxidant injection area comprising the single oxidant injection opening.

5. The apparatus of claim 4 wherein the contactor vessel, the reactant material conduit, oxidant conduit, and water conduit are each substantially cylindrical in shape.

6. An apparatus for bringing an oxidant into contact with a reactant material to facilitate a hydrothermal oxidation of the reactant material, the apparatus including:

(a) a contactor vessel having an inner wall defining a contactor volume and encompassing an initial contact zone spaced apart from the contactor vessel inner wall;

(b) a reactant material conduit connected to the contactor vessel and positioned to inject a reactant material into the initial contact zone within the contactor vessel;

(c) an oxidant injection arrangement including one or more oxidant injection openings into the contactor vessel at points spaced apart from the initial contact zone; and (d) a separation material injection arrangement including a separation material conduit with at least one separation material opening into the contactor vessel in position to inject a separation material into the contactor vessel between each oxidant injection opening and the reactant material injector, the separation material conduit having a diameter larger than the diameter of the reactant material conduit and being mounted coaxially with the reactant material conduit, the annular area between the end of the reactant material conduit and the end of the separation material conduit comprising a separation material injection area.

7. The apparatus of claim 6 wherein the oxidant injection arrangement includes:

(a) an oxidant injection conduit having a diameter larger than the diameter of the separation material conduit and mounted coaxially with the separation material conduit, the annular area between the end of the separation material conduit and the oxidant conduit comprising a single oxidant injection opening into the contactor vessel.

8. The apparatus of claim 7 wherein the end of the reactant material conduit, the end of the separation material conduit, and the single oxidant injection opening all reside in substantially a common plane.

9. The apparatus of claim 8 wherein the inner wall of the contactor vessel is substantially cylindrical defining a longitudinal contactor axis and the reactant material conduit is mounted substantially coaxially with the contactor vessel inner wall.

10. A method for bringing an oxidant into contact with a reactant material to facilitate a hydrothermal oxidation of the reactant material, the method including the steps of:

(a) with a reactant material at an elevated reactant material temperature and at a processing pressure above the critical pressure, injecting the reactant material into a contactor vessel through a reactant material injection area of an injection plane, the reactant material injection area being spaced apart from the inner walls of the contactor vessel;

(b) injecting a separation material at the processing pressure into the contactor vessel through a separation material injection area, the separation material injection area comprising an annular area in the injection plane surrounding the reactant material injection area; and (c) injecting an oxidant into the contactor vessel at one or more oxidant injection points substantially in the injection plane and separated from the reactant material injection area by a portion of the separation material injection area.

11. The method of claim 10 further including the step of:

(a) heating the reactant material to the reactant material temperature.

12. The method of claim 11 wherein the step of heating the reactant material includes the step of:

(a) placing the pressurized reactant material in a heat exchange relationship with an effluent from the hydrothermal oxidation reaction.

13. The method of claim 12 wherein the separation material includes water and further including the step of:

(a) heating the water to a water injection temperature above the critical temperature for water.

14. The method of claim 13 wherein the step of heating the water includes the step of:

(a) placing the pressurized water in a heat exchange relationship with an effluent from the hydrothermal oxidation reaction.

15. A method of bringing an oxidant into contact with a reactant material to facilitate a hydrothermal oxidation reaction of the reactant material, the method including the steps of:

(a) with the reactant material heated to an elevated reactant material temperature and at a processing pressure above the critical pressure, injecting the heated and pressurized reactant material into an initial contact zone within a contactor vessel, the contactor vessel having an inner wall defining a contactor volume and the initial contact zone being located within the contactor volume spaced apart from the contactor inner walls;

(b) with a separation material heated to a separation material injection temperature and pressurized to substantially the processing pressure, injecting the heated and pressurized separation material into the contactor vessel at least at one separation material injection area adjacent to the reactant material being injected into the contactor volume; and (c) injecting an oxidant into the contactor vessel at one or more oxidant injection points, each oxidant injection point being spaced apart from the initial contact zone by a separation material injection area.

16. The method of claim 15 wherein the reactant material, separation material, and oxidant are each injected into the contactor vessel from a common injection plane.

17. The method of claim 15 further including the step of placing the separation material in a heat exchange relationship with effluent from a hydrothermal oxidation reaction facilitated by the method of the invention.

18. The method of claim 17 further including the step of placing the reactant material in a heat exchange relationship with effluent from the hydrothermal oxidation reaction.

19. The method of claim 15 wherein the reactant material temperature is a temperature below a charring temperature for the reactant material.

20. The method of claim 15 wherein the separation material includes water and the water injection temperature is a temperature at or above the critical temperature for water.

21. The method of claim 15 further including the step of:
(a) controlling the separation material temperature and the reaction material temperatures so as to produce a temperature at or above a salt precipitation temperature at the initial contact zone.

22. An apparatus for bringing an oxidant into contact with a reactant material to facilitate a hydrothermal oxidation of the reactant material, the apparatus including:
(a) an oxidant injector arrangement defining an oxidant injection area adjacent to a peripheral wall of a contactor vessel, the oxidant injector arrangement including an oxidant supply connection to an oxidant supply;
(b) a reactant materials injector arrangement defining a reactant material injection area, the reactant material injector arrangement including a reactant material connection to a reactant material supply; and
(c) a separation material injector arrangement defining an annular separation material injection area interposed between the reactant material injection area and the oxidant injection area, the separation material injector arrangement including a separation material connection to a separation material supply.

23. An apparatus for bringing an oxidant into contact with a reactant material to facilitate a hydrothermal oxidation of the reactant material, the apparatus including:
(a) a contactor vessel;
(b) an oxidant injector arrangement defining an oxidant injection area leading into the contactor vessel;
(c) a reactant material injector arrangement defining a reactant material injection area leading into the contactor vessel; and
(d) a separation material injector arrangement defining a separation material injection area interposed between the second injection area and the first injection area, the separation material injection area comprising a substantially continuous annular opening leading into the contactor vessel.

24. The apparatus of claim 23 wherein the oxidant injection area comprises a substantially continuous annular opening leading into the contactor vessel.

25. The apparatus of claim 24 wherein an outer boundary of the oxidant injection area is adjacent to a peripheral wall of the contactor vessel.

* * * * *

UNITED STATES PATENT AND TRADEMARK OFFICE
CERTIFICATE OF CORRECTION

PATENT NO. : 6,475,396 B1
DATED : November 5, 2002
INVENTOR(S) : William Tracy Wofford, III et al.

It is certified that error appears in the above-identified patent and that said Letters Patent is hereby corrected as shown below:

Title page,
Item [57], ABSTRACT,
Line 3, change "a contractor. vessel (11)." to -- a contractor vessel (11). --
Line 10, change "generally in.the" to -- generally in the --

Column 3,
Line 1, change "More to" to -- More --
Line 31, change "portions. of" to -- portions of --
Line 33, change "associate" to -- associated --
Line 36, change "zone. if" to -- zone. --

Column 4,
Line 31, change "water,injection area" to -- water injection area --
Line 54, change "in a heat a" to -- in a heat --

Column 5,
Line 55, change "conduit 12:" to -- conduit 12 --
Line 56, change "within 18" to -- within --

Column 6,
Line 7, change "material-for" to -- material for --
Line 23, change "and" to -- end --

Column 7,
Line 7, change "Water 1A" to -- Water --

Column 9,
Line 57, change "(at plane in FIG. 3)" to -- (at plane Z in FIG. 3) --

Column 11,
Line 8, change "preferably," to -- preferably --

Column 12,
Line 19, change "sludge-exiting" to -- sludge exiting --

UNITED STATES PATENT AND TRADEMARK OFFICE
CERTIFICATE OF CORRECTION

PATENT NO.     : 6,475,396 B1
DATED          : November 5, 2002
INVENTOR(S)    : William Tracy Wofford, III et al.

It is certified that error appears in the above-identified patent and that said Letters Patent is hereby corrected as shown below:

Column 15,
Line 27, change "wall of:a" to -- wall of a --
Line 30, change "materials" to -- material --

Column 16,
Line 13, change "injector:arrangement" to -- injector arrangement --

Signed and Sealed this

Eleventh Day of March, 2003

JAMES E. ROGAN
*Director of the United States Patent and Trademark Office*